Figure 1:
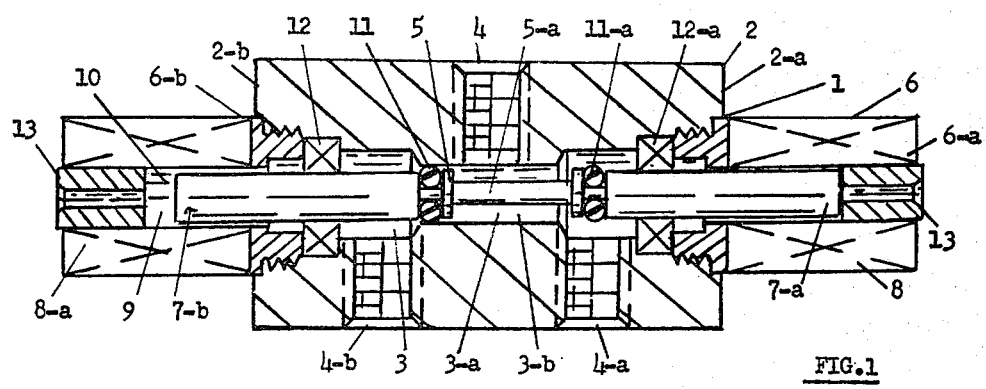

United States Patent [19]

Pauliukonis

[11] 4,317,469
[45] Mar. 2, 1982

[54] MOMENTARY CONTACT DIVERTER VALVE

[76] Inventor: Richard S. Pauliukonis, 6660 Greenbriar Dr., Cleveland, Ohio 44130

[21] Appl. No.: 169,826

[22] Filed: Jul. 17, 1980

Related U.S. Application Data

[63] Continuation-in-part of Ser. No. 9,678, Feb. 5, 1979, Pat. No. 4,231,399.

[51] Int. Cl.³ .............................................. F16K 31/06
[52] U.S. Cl. ......................... 137/625.65; 137/625.27; 137/625.5
[58] Field of Search .......... 137/625.27, 625.4, 625.43, 137/625.48, 625.5, 625.64, 625.65

[56] References Cited

U.S. PATENT DOCUMENTS

| 2,638,122 | 5/1953 | Ludwig | 137/625.65 |
| 2,916,019 | 12/1959 | Murphy | 137/625.65 |
| 2,983,285 | 5/1961 | Gardner | 137/625.65 |
| 3,384,122 | 5/1968 | Harpman | 137/625.64 |
| 3,951,166 | 4/1976 | Whitener | 137/625.27 |

FOREIGN PATENT DOCUMENTS 1550632  1/1970  Fed. Rep. of Germany ........................ 137/625.65

*Primary Examiner*—Robert G. Nilson
*Attorney, Agent, or Firm*—Richard S. Pauliukonis

[57] ABSTRACT

A simple momentary contact diverter valve is operated directly by axially disposed solenoid operators at each end of an elongated valve housing having a bore passing therethrough to receive a valving spool therein in an operable relationship with said solenoid operators so as to enable spool shifting directly to result in diversion of fluid flow passing therethrough between fluid supply and exhaust ports incorporated therein, energization of operator coils electrically accomplished momentarily by an application of voltage-overcharge-pulse to yield higher than conventional magnetic force resulting in more than conventionally accepted pull force spool experiences, thereby increasing capability of handling fluid pressures substantially above those attainable by direct solenoid operated valves of this type.

6 Claims, 3 Drawing Figures

MOMENTARY CONTACT DIVERTER VALVE

This is a Continuation-In-Part of my copending application Ser. No. 009,678 Filed Feb. 5, 1979, now allowed to issue as U.S. Pat. No. 4,231,399.

This application relates to momentary contact solenoid operated diverter values in general, and to a simplified momentary contact diverter valve that is operated directly by a solenoid operator in particular, characterized by valve operation wherein an electric pulse, often of voltage overcharge, is applied to a solenoid coil for a split second, preferably not exceeding 30 miliseconds in duration, to cause position change of a spool resulting in flow redirection by such valves be it liquid or gas.

Internally piloted momentary contact reversing diverter, disclosed in the parent invention identified above, describes characteristics novel to the state of the art in valving. Although, because of the pilot pressure force internally piloted valves entail, such valves have no practical limits as to the system pressures or drag forces they can serve, the truth remains that there are too numerous application prohibiting the use of piloted designs due to many reasons, such as the fact that the fluid can not be exhausted from the solenoid cavity conveniently, or that there is only marginal pressure in the system such valves serve, or that the system is not conducive to the use of piloted valves, to name a few.

It was established experimentally that cutting off fluid exiting a port by a piston of a spool includes a sizeable fluid force, which force is purely depedent on pressures of the fluid valved coupled with configuration and size of the passage fluid is flowing through before being cutt-off. Unless the spool is internally piloted to permit fluid force aid in spool shifting while crossing central fluid supply port large in size, often feeding a narrow slot offering reduced stroke for spool shifting inside valve while maintaining large fluid flow capacity, pilotless direct solenoid operated spool shifting must first consider the availability of a magnetic force solenoid coils can provide directly to the spool ends, in a similar fashion the plungers of the internally piloted (parent) reversing diverter operated, in order to insure proper valve operation. In final analysis, it was deduced that a direct operated momentary contact diverter valve can be designed so that the spool can be shifted by a magnetic force solenoid coils provide without any consideration to the pressure cut-off forces fluid produces. This was possible by the use of two seals for control of flow redirection and diversion of pressurized fluid from entrance port in lieu of a single seal shown in the parent diverter performing fluid cut-off when spool is shifted, thereby departing away from the original diverter design in-part. Further, by selecting solenoid coils with lower electrical resistance as measured by Ohms, additional gain materialized in that the coils with lower resistance were momentarily voltage overcharged for higher magnetic pull force without overheating, departing substantially from the conventional practice wherein coils must be sized in accordance with service to prevent burn-out.

The object of the present invention is therefore to provide a direct solenoid operated simple diverter valve with spool ends of valving means acting as solenoid plungers capable of magnetic shifting for flow redirection through the valve.

Another object of this invention is to provide a novel momentary contact valve which is simple to manufacture, assembly and maintain, and in particular to operate with practically negligible power requirement electrically.

In this connection, the valve of present invention consists of basically two components, namely a valve housing with a single bore passing therethrough and a simple valving spool slidably received therein, plus two end solenoid operators secured at each opposite housing ends by threads for a momentary energization electrically resulting in instant spool position change when one of the solenoid coils exerts larger than conventionally accepted magnetic pull force due to voltage overcharge pulse of a very brief duration over one of spool ends provided with magnetic material, to serve pressures and fluid flows therewith of considerably larger magnitude than those attainable by conventional valves, thereby greatly improving the state of the art in solenoid valves in general and in momentary contact solenoid valves in particular, since there are no direct operated solenoid valves of momentary contact with such capabilities in existance.

These and other objects and advantages of the invention will become more fully apparent from the following description of an embodiment of the invention, taken together with the accompanying drawings.

IN THE DRAWINGS

FIG. 1 is a cross sectional view of a 3-ported direct solenoid operated momentary contact valve showing basic components such as valve housing, valving spool & operators.

Figure 2:
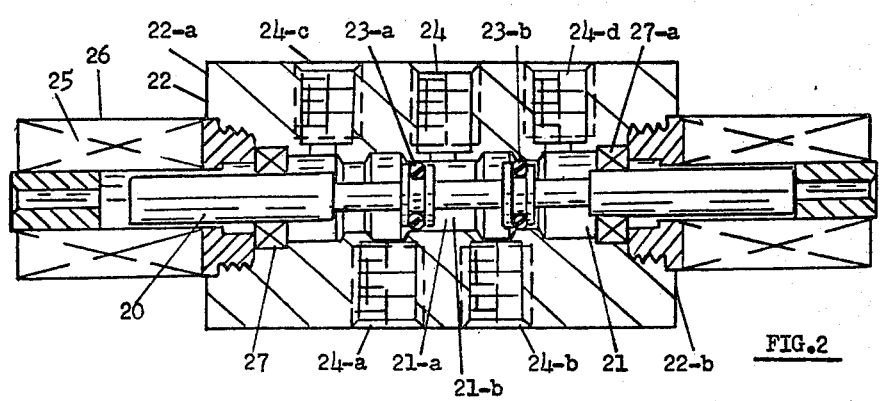

FIG. 2 identifies 5-ported diverter valve otherwise identical to that shown in FIG. 1

Figure 3:
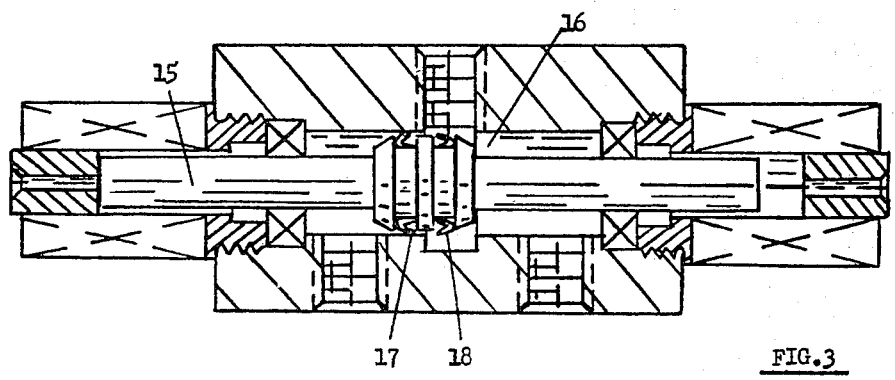

FIG. 3 identifies another version of 3-ported diverter with dual seal on spool piston to permit larger flow passage therethrough, otherwise the same as that shown in FIG. 1

Shown in FIG. 1 is an assembly of a momentary contact diverter 1 operated directly by a pair of solenoid operators 6. An elongated valve housing 2 is shown to have a bore 3 passing therethrough including fluid port 4 entering bore 3 perpendicularly through a wall, along with ports 4a and 4b spaced a short distance away from port 4 along the housing length. A slidably movable valving spool 5 inside housing bore 3 with ends 7a and 7b protruding housing ends 2a and 2b respectively into solenoid cavities 9 comprising an extension of bore 3 permits, indeed, an operable relationship therebetween, wherein when a first solenoid coil 8 of a first solenoid operator 6a is electrically energized by a surge of voltage overcharge for a short period in miliseconds, preferably below 30 miliseconds, to result in a large magnetic pull force over first spool end 7a capable of attracting spool 5 to and maintaining in the position shown in FIG. 2-right, the second spool end 7b inside cavity 9 of a second solenoid operator 6b forms left an end gap 10 between a stop 13 and end 7b shown in FIG. 1, while when a second solenoid coil 8a of a second solenoid operator 6b becomes electrically energized momentarily, the reversal takes place and the valving spool becomes shifted by the magnetic pull force surrounding a second extreme spool end 7b to the left to have a second identical end gap formed in the opposite cavity of solenoid operator 6a (not shown), and vice versa, wherein a brief energization of either of solenoid coils electrically provides powerful means of spool position change inside bore 3, accomplishing change in flow direction through the valve be it 2-ported valve wherein a third port shown in FIG. 1 is blocked or three ported valve as illustrated therein, without further use of electrical power between the momentary energization periods which normally constitute a short pulse service, adaptable for higher voltage applications to conventional coils without the fear of overheating them.

Close analysis of valve design of FIG. 1. reveals the following unique characteristics: seals 11 and 11a permanently secured inside grooves of spool 5 slide inside reduced diameter central bore portion 3a provided with inlet port 4 centrally therein, along with spool position change. As shown in FIG. 1, when spool is in a first location-right, fluid entering port 4 is in direct communication with port 4a via annulus 3b formed between bore portion 3a and a reduced diameter central spool section 5a between seals 11 and 11a facilitating ample flow passages therebetween with seal 11a disengaged from bore portion 3a, while seal 11 is engaged in the opposite end of bore portion 3a prohibiting fluid communication between ports 4 and 4b until spool 5 is shifted to the left when solenoid coil 8a is energized at which time seal 11a will block off port 4a allowing fluid communication to proceed from port 4 via annulus 3b into port 4b, and vice versa.

Port 4 in reality is not subjected to a cut-off by a single seal shown and claimed to perform flow diversion function in the parent application. Instead, when seal 11 engages, seal 11a disengages simultaneously without upsetting continuity of flow. No drastic fluid forces develop during flow reversal by this diverter subject to consideration since present design employs two seals to control direction of fluid entering the valve. This type of dual sealing permits control of larger pressures without undue requirement for larger magnetic force. Ergo, smaller & less costly coils can be used here.

Likewise, having seals 12 and 12a fixed inside respective housing ends 2 and 2a while spool ends 7b and 7a respectively slide on inside seal diameters, less friction is generated by the seals during spool shifting axially. Finally, since seals 11 and 11a travel axially very little, and since seals 12 and 12a are detacheable, valve manufacture and assembly, as well as maintenance are reduced to the bare minimum. Obviously, if port 4 is designated to be fluid supply port, ports 4a and 4b then become fluid exhaust or receiver port means alternatingly communicating with supply port 4 when valving spool 5 is shifted between solenoid operators 6a and 6b, consistent with operation of typical diverters or reversing valves used in solar heating, air-conditioning/heat pump systems, process or automation control. However, port 4 may equally become a receiver port in systems requiring mixing of two fluids supplied via ports 4a and/or 4b alternatingly, or individually. In such cases diverter becomes mixer valve of momentary contact, direct solenoid operated design, requiring consideration of supply pressures, because often fluids to be mixed are subject to pressure variations which may force spool drifting to the side experiencing lower pressure. To insure driftless spool position, seals 11 and 11a of FIG. 1 were spaced closer together on a new spool 15 inside a straight bore 16 of a large capacity valve of FIG. 3 which incorporates another version of 3-ported diverter with dual seals 17 and 18 otherwise identical to the diverter shown in FIG. 1.

In FIG. 2 identifying 5-ported diverter with spool 20 inside bore 21 both of which contain diameteral variations to facilitate proper flow passages, the major difference is in the housing which contains 5-ports entering housing bore 21 perpendicularly, and a first fluid supply port 24 is located centrally between a first housing end 22a and a second housing end 22b of an elongated housing 22 while receiver ports 24a and 24b are spaced a short distance away along the housing length so as to allow fluid exhaust ports 24c and 24d to be spaced adjacent housing ends 22a and 22b respectively. Like in FIG. 1, the housing of FIG. 3 is provided with a reduced diameter central bore portion 21a receiving pressurized fluid via port 24 to proceed inside annulus 21b guarded by seals 23a and 23b respectively so that when spool 20 is in the first position shown in FIG. 3 right, fluid communication is established between fluid supply port 24 and a first receiver port 24b while a second receiver port 24a is exhausting via port 24c until coil 25 of left solenoid operator 26 is electrically energized urging spool position change to the left (not shown in FIG. 2 but visible in FIG. 3) thereby redirecting flow to proceed from port 24 into port 24a while allowing receiver port 24b to exhaust via port 24d, and vice versa. End seals 27 and 27a inside housing bore adjacent ends 22a and 22b respectively protect exhaust ports 24c and 24d. Like in FIG. 1, seals of FIG. 3 generate very little frictional resistance rendering valve ideally suited for high pressure service while using conventional solenoid coils electrically voltage overcharged. Since valves of FIG. 1, FIG. 2 and FIG. 3 in design and operation are identical, having 3 or 5 ports makes little difference to consider patenting them separately. It should be noted that spools of FIG. 1, FIG. 2 and FIG. 3 must either by produced from magnetic materials known as ferritic, including stainless steels from ferritic group 400 series such as 410 or 430 stainless if they are made as solid one piece spools, or if they are produced from other materials in order to satisfy specific requirements calling for wetted surfaces of the spool to be made from plastics or other non-ferritic materials such as aluminum, spool ends that enter operator cavities must be ferritic in order to insure spool shifting by a magnetic force solenoid coils generate when energized electrically. Likewise, spool ends may be increased in diameter above that of dual seals considerably more than shown in FIG. 1 and 2 to insure driftless spool position selected. Other changes eliminating or adding certain specific structural or procedural details may be made in the above described diverter without departing from the invention.

What is claimed is:

1. A momentary contact diverter valve comprising:
   an elongated valve housing with a bore passing therethrough between a first and a second housing ends closed by a pair of electrical solenoid operators with operator cavities forming an extension of said housing bore adaptable of slidably receiving a valving spool with dual seals in an operable relationship therebetween,
   a plurality of fluid ports along said housing length including a fluid supply and exhaust port means entering said bore through a housing wall perpendicularly so as to allow fluid valved enter a first port serving as a fluid supply port for communication with a second port serving as a first fluid receiver port while a third port serving as a second fluid receiver port is disconnected therefrom by a first spool seal when said spool is in a first position having a first spool end abut a first stop of a first solenoid operator inside a first operator cavity, and when said spool is shifted to a second position opposite said first position so as to have a second spool end abut a second stop of a second solenoid operator inside a second operator cavity while forming a gap at the first spool end against said first stop, fluid flow is diverted from said first fluid supply port for communication with said third port while said second port is disconnected therefrom by a second spool seal, and vice versa, including a pair of detachable seals inside bore ends adjacent said operators, and a first detachable seal is held fixed by a first operator inside said first housing end while a second detachable seal is held fixed by a second operator inside said second housing end, said spool position change with flow reversals dependent on solenoid operators wherein a brief energization of solenoid coils of either of said operators electrically by a momentary pulse provides a powerful means for spool shifting magnetically acting over said spool ends inside said operator cavities, said valve housing, said spool with said dual seals spaced a short distance apart substantially in the center thereof and movable therewith when spool is shifted for said position change, said detachable seals inside said housing ends closed by said solenoid operators readily adaptable for maintenance thereof wherein removal of one of said operators permits spool withdrawal from said bore for servicing and subsequent return thereto without the need of valve removal from the system it serves.

2. A momentary contact diverter valve as in claim 1 wherein said first and second receivers are provided with individual exhaust ports adjacent said housing ends, and when said spool is in said first position, said second receiver is open to exhaust via a first exhaust port, spaced adjacent said second operator, in communication with said third port of said bore while a second exhaust port spaced adjacent said first operator is disconnected by said second spool seal, and when said spool is in said second position, said first receiver is open to exhaust via said second exhaust port in communication with said second port of said bore while said first exhaust port becomes disconnected therefrom by said first spool seal, and vice versa.

3. A momentary contact diverter valve as in claim 1 wherein said bore at each housing end is provided with a counterbore for receiving said detachable seal fixed in said counterbore by said solenoid operators, said counterbore having a diameter slightly larger than the diameter of said bore ends to render a shoulder for retaining said detachable seals therein.

4. A momentary contact diverter valve as in claim 1 wherein said bore includes a central bore portion of smaller diameter than the rest of the bore length but not larger than the diameter of said solenoid operator cavity controlling outside diameter of said spool for less costly manufacture thereof.

5. A momentary contact diverter as in claim 1 wherein said spool is made from ferritic material including stainless steel 400 group such as 410 or 430 stainless.

6. A momentary contact diverter as in claim 1 wherein said spool ends are ferritic, having a diameter slightly larger than the diameter of said dual spool seals.

* * * * *